Oct. 13, 1925.

W. H. EICHELMAN

VAPOR DISPOSAL APPARATUS

Filed May 31, 1921

1,557,442

Inventor:
William H. Eichelman
By Banning & Banning
Attys.

Patented Oct. 13, 1925.

1,557,442

UNITED STATES PATENT OFFICE.

WILLIAM H. EICHELMAN, OF DOWNERS GROVE, ILLINOIS.

VAPOR-DISPOSAL APPARATUS.

Application filed May 31, 1921. Serial No. 474,003.

*To all whom it may concern:*

Be it known that I, WILLIAM H. EICHELMAN, a citizen of the United States, residing at Downers Grove, in the county of Du Page and State of Illinois, have invented certain new and useful Improvements in Vapor-Disposal Apparatus, of which the following is a specification.

This invention is intended primarily for use in association with driers and evaporators of the type commonly employed for the drying of tankage, blood, stick, garbage, etc., which are ordinarily transformed into fertilizers and stock foods; and the object of the present invention is to remove the products of evaporation and to make provision for the disposal of the odors occasioned in such drying process, which if emitted into the atmosphere would pollute or befoul the same.

The apparatus also makes provision for the recovery of the grease or products of a lighter gravity which may pass off from the dryer or evaporator; affords means for the discharge of the soluble constituents into a sewer or the like, and provides for the conveyance of the insoluble gases or vapors to burners or the like, where they are consumed or rendered inoffensive prior to their discharge into the atmosphere.

The apparatus also makes provision for the recovery of such products as may be carried off through the outlet from the drying tank by entrainment with the vapors discharging therefrom.

Although the invention is primarily intended for the purposes above stated, it is applicable for uses in connection with fatty acid stills, glycerine evaporators and stills, solvent recovery apparatus, etc., where similar conditions are encountered. The apparatus affords a closed system for maintaining a vacuum to remove the vapors from the drying mass, and also for the removal of the insoluble gases, thereby obviating the use of a separate pump or trap in a system for this purpose.

Figure 2:
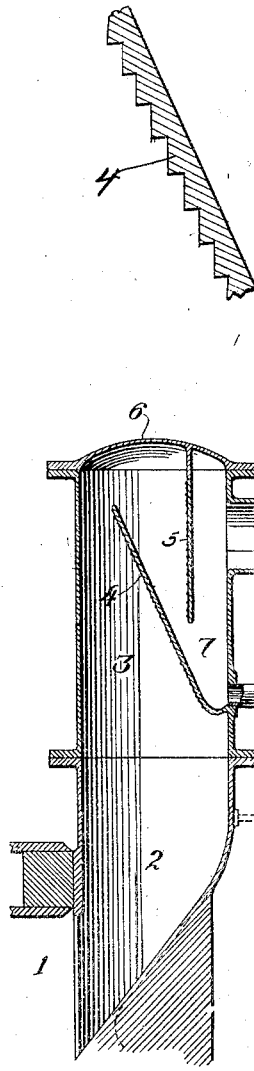
Figure 1:
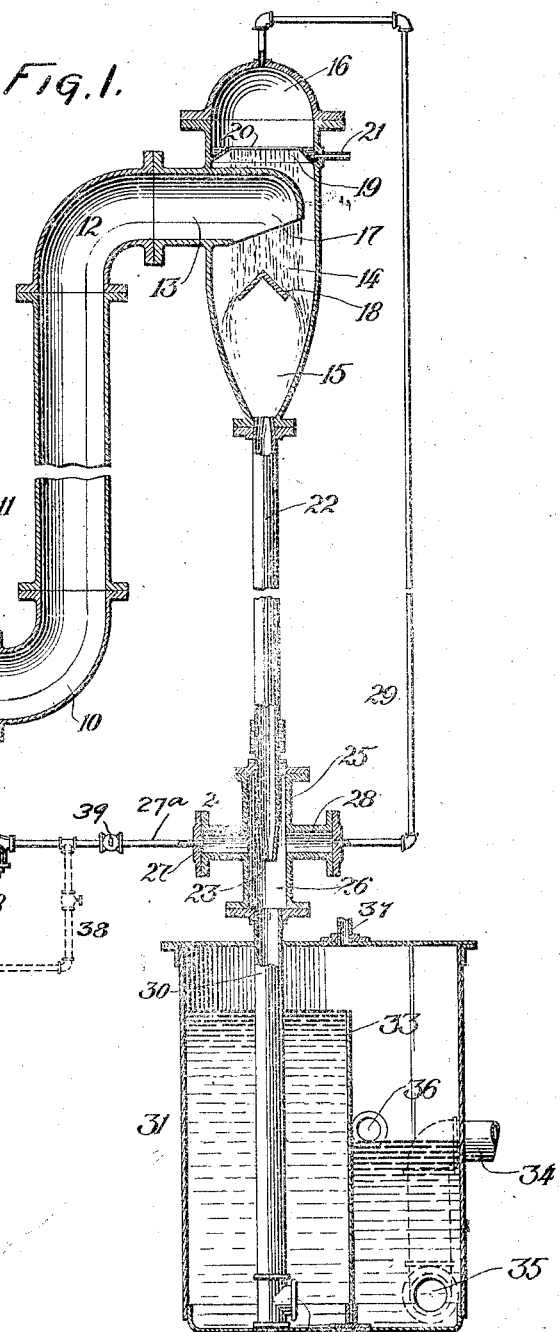

In the drawings Fig. 1 is a sectional view of the entire apparatus shown in association with the discharge end of a drier; and Fig. 2 is an enlarged sectional detail of one of the serrated baffle plates.

The numeral 1 represents the body of a drier, preferably of the well known type which employs a shell or steam jacket, which driers are provided with an outlet 2, to which is secured a cylindrical separator and catchall 3, provided with a lower baffle plate 4, and an overlapping upper baffle plate 5, each of the baffle plates being provided with a roughened or serrated face presented toward the escaping vapors and gases for the purpose of primarily throwing down any of the materials which may be entrained with the current of vapors escaping from the drier.

The lower baffle is obliquely disposed and is connected to the outer side wall of the separator, and the upper baffle is vertically disposed and depends from the closing cap 6 on the top of the separator. The mergence of the lower baffle into the side wall provides a pocket 7 whence leads a condensation drain pipe 8 adapted to drain off moisture of condensation which may collect in the separator. Near its upper end, the separator is provided with an outlet 9 to which is secured an elbow 10 connected with a vertical vapor discharge pipe 11, which in turn connects with an upper elbow 12 which makes connection with an inlet passage 13 outstanding from the side wall of a barometric condenser 14. The barometric condenser is of generally cylindrical shape tapered at its lower end 15 and provided at its upper end with a dome-shaped cap 16. The inlet passage 13 extends to a point in the interior of the condenser and is downturned at its lower end 17 to project the vapors downwardly against a conical baffle 18.

Above the inlet passage is located an annular upwardly converging collar 19 open at its center 20, which affords a water dam for the overflow of water admitted through a water inlet pipe 21, the arrangement being such as to cause water to overflow the dam in the form of an open cylindrical sheet, thereby serving to condense the condensable vapors and ensuring a commingling thereof with the sheet of falling water, the vapors and the water passing down through the lower end of the condenser and into a water leg 22, the lower end of which makes connection with a tapered nozzle 23 forming part of a coupling 24. The elevation of the condenser and pipes and passages connected therewith is sufficient to prevent the rise of water occasioned by the maintenance of vacuum conditions to such a point as to flood the lower end of the condenser, thereby giving to the condenser the character of a barometric condenser.

The coupling 24 is in the form of a cross-shaped coupling having an upper extension 25, a lower extension 26, and side extensions 27 and 28, respectively, the former of which affords connection for the drain pipe 8 through a tube 27ª, and the latter affording connection for a lead of pipe 29 which extends upwardly and is entered into the top of the dome-shaped cap plate 16 on the condenser. The tapered nozzle is carried to a point below the center of the coupling, that is to say, beyond the plane of the side extensions 27 and 28, so that the outrushing water will maintain a suction at this point sufficient to clear the drain pipe 8 and also suck out the insoluble gases which accumulate at the top of the condenser and are thence conducted through the pipe 29 and carried down with the falling water.

The lower extension 26 of the coupling connects with a pipe 30 leading to the bottom of a hot well 31, the pipe 30 being provided at its lower end with a fitting 32 which opens laterally, thereby discharging the water into the hot well, which latter is provided with a cross partition wall 33, which maintains a body of water in the hot well surrounding the lower end of the pipe 30. On the far side of the partition wall 33 the water is maintained at a lower level by the provision of an eduction pipe 34 the end of which is downturned and enters the discharge chamber of the hot well through an opening 35 near the bottom thereof. The discharge pipe or overflow pipe 34 leads to a sewer or other point of discharge, and in order to afford means for the reclamation of the grease which may accumulate at this point, a grease draw-off cap 36 is provided, which permits the grease to flow from the surface of the water, the level of the grease top being regulated in conformity with the water level maintained in the discharge pipe 34. The insoluble gases are educted through a pipe 37 to a burner and consumed.

In operation, when the vapors begin to flow from the drier, they will pass through to the separator, and thence to the condenser, at which point the vapors will encounter the sheet of water flowing over the water dam and be partially condensed, thereby creating a partial vacuum in the condenser, which serves to more readily educt the accumulating vapors in the drier and to establish a positive current therefrom. As the drying progresses, solid or dust-like particles caught by the current will be carried upwardly to the separator, but such dust-like particles will be thrown back by contact with the baffle plates. Any vapors which may be condensed in the separator or vapor lines leading to the condenser will accumulate and be discharged from the pocket 7, being sucked out therefrom by reason of the vacuum occasioned by the rapid discharge of water through the coupling.

The insoluble gases which are not condensed in the condenser will tend to rise to the top thereof, and will be conducted through the insoluble-gas pipe line 29, being drawn therethrough by the suction occasioned by the jet of falling water passing through the nozzle 23. The coupling is located in the water leg at a height equal to the degree of vacuum required, and as the coupling will pull a vacuum equal to the water leg above, it will be seen that I have a well balanced and closed system which adequately removes the vapors of evaporation, the required vacuum being controlled by the amount of water passing over the water dam. The height of the water leg will be computed with reference to the amount of water discharged and with reference to the temperature maintained in the system.

When this system is used on evaporators or stills where the mechanical entrainment of the product being reduced is excessive, the reservoir or pocket 7 is connected by a valved pipe 38, directly back into the vapor chest of the evaporator instead of to the coupling, as shown; which provides for the recovery of its product, thus preventing its loss by passing into the hot well.

In this construction a valve 39 is provided in the tube 27ª so as to close the connection with the coupling as occasion may require.

The terms drier and evaporator are to be used interchangeably throughout the specification and appended claims.

I claim:

1. In an apparatus for the disposal of vapors or the like, in combination with a source of vapor, a separator at the discharge end of said source provided with a baffle plate for the throwing down of solids carried out therefrom, a condenser located at a level above the separator, a conduit from the separator to the condenser, means within the condenser for providing a sheet of falling water therethrough, a water leg leading from the lower end of the condenser, a coupling at the lower end of the water leg, and adapted in conjunction therewith to maintain a vacuum, said coupling being provided with a discharge nozzle connected with the water leg, a water discharge pipe leading from the coupling, a well within which the water discharge pipe is sealed, means for educting water from the well, and a drain pipe connecting the separator with the coupling, substantially as described.

2. In an apparatus for the disposal of vapors or the like, in combination with a source of vapor, a separator at the discharge end of said source provided with a baffle plate for the throwing down of solids carried out therefrom, a condenser located at a level above the separator, a conduit from the separator to the condenser, means within the condenser for providing a sheet of falling water therethrough, a water leg leading from the lower end of the condenser, a coupling at the lower end of the water leg and adapted in conjunction therewith to maintain a vacuum, said coupling being provided with a discharge nozzle connected with the water leg, a water discharge pipe leading from the coupling, a well within which the water discharge pipe is sealed, and a drain pipe connecting the separator with the siphon, substantially as described.

3. In an apparatus for the disposal of vapors or the like, in combination with a source of vapor, a separator located at the discharge end of said source, a condenser located at a higher level than the separator and provided with a flange constituting a circular water dam, a conduit leading from the separator for discharging vapors into the condenser at a point below the water dam, means for supplying water to the water dam, a water leg leading from the lower end of the condenser, a coupling connected with the water leg and adapted in conjunction therewith to maintain a vacuum, and provided with a water discharge nozzle, a water discharge pipe leading from the coupling, a well into which the discharge pipe extends and within which it is sealed, a partition wall within the well for maintaining said water seal, a water eduction pipe leading from the well on the far side of the partition wall, and a drain pipe leading from the separator to the coupling, substantially as described.

4. In an apparatus for the disposal of vapors or the like, in combination with a source of vapor, a separator located at the discharge end of said source, a condenser located at a higher level than the separator and provided with a flange constituting a circular water dam, a conduit leading from the separator for discharging vapors into the condenser at a point below the water dam, means for supplying water to the water dam, a water leg leading from the lower end of the condenser, a coupling connected with the water leg and adapted in conjunction therewith to maintain a vacuum and provided with a water discharge nozzle, a water discharge pipe leading from the coupling, a well into which the discharge pipe extends and within which it is sealed, a partition wall within the well for maintaining said water seal, a water eduction pipe leading from the well on the far side of the partition, a pipe leading from the top of the condenser to the coupling for educting insoluble gases, and a drain pipe leading from the separator to the coupling, substantially as described.

5. In an apparatus for the disposal of vapors or the like, in combination with a source of vapor, a combined separator and catchall communicating therewith, a condenser in communication with said separator, means for admitting water to the condenser, a water leg leading downwardly therefrom, a coupling connected with the water leg and adapted in conjunction therewith to maintain a vacuum, a pipe leading from the coupling to the catchall, and a pipe leading from the coupling to the condenser at a point above its connection to the separator, substantially as described.

6. In an apparatus for the disposal of vapors or the like, in combination with a drier, a catchall communicating therewith, a condenser in communication with the catchall, means for admitting water to the condenser, a water leg leading therefrom, a coupling terminating said water leg, and adapted in conjunction therewith to maintain a vacuum, a pipe leading from the coupling to said catchall, and an eduction pipe for insoluble gases leading from the top of the condenser and connected with the coupling, substantially as described.

7. In an apparatus for the disposal of vapors or the like, in combination with a source of vapor, a condenser located at a level above the outlet from said source, a conduit from said outlet to the condenser, a water leg leading from the lower end of the condenser, a coupling at the lower end of the water leg, and adapted in conjunction therewith to maintain a vacuum, said coupling being provided with a discharge nozzle connected with the water leg, a water discharge pipe leading from the coupling, and a drain pipe connecting the separator with the coupling, substantially as described.

WILLIAM H. EICHELMAN.